United States Patent [19]

McDaniel

[11] Patent Number: 4,717,701

[45] Date of Patent: Jan. 5, 1988

[54] OLEFIN POLYMERIZATION

[75] Inventor: Max P. McDaniel, Bartlesville, Okla.

[73] Assignee: Phillips Petroleum Company, Bartlesville, Okla.

[21] Appl. No.: 896,026

[22] Filed: Aug. 13, 1986

Related U.S. Application Data

[62] Division of Ser. No. 688,928, Jan. 4, 1985, Pat. No. 4,622,371.

[51] Int. Cl.$^4$ ............................. C08F 4/62; C08F 4/70
[52] U.S. Cl. .................................... 502/107; 502/113;
502/150; 502/154; 502/170; 502/171; 502/207;
502/210; 502/213
[58] Field of Search ............... 502/113, 150, 154, 170,
502/171, 207, 210, 213, 107

[56] References Cited

U.S. PATENT DOCUMENTS

| | | | |
|---|---|---|---|
| 2,930,788 | 3/1960 | Banks | 526/103 |
| 2,945,015 | 7/1960 | Detter | 502/210 X |
| 3,327,012 | 6/1967 | Noddings et al. | 502/213 X |
| 3,342,750 | 9/1967 | Kearby | 252/437 |
| 3,757,002 | 9/1973 | Karol | 260/94.9 |
| 3,904,550 | 9/1975 | Pine | 252/437 |
| 4,219,444 | 8/1980 | Hill et al. | 252/435 |
| 4,364,841 | 12/1982 | McDaniel et al. | 252/430 |
| 4,424,139 | 1/1984 | McDaniel et al. | 502/117 |
| 4,481,302 | 11/1984 | McDaniel et al. | 502/210 X |
| 4,528,338 | 7/1985 | McDaniel et al. | 526/106 |

FOREIGN PATENT DOCUMENTS 1505818  3/1978  United Kingdom ................ 526/106

OTHER PUBLICATIONS

Journal of Polymer Science, Polymer Chemistry Edition, vol. 19, pp. 1967–1976, (1981).

*Primary Examiner*—Patrick P. Garvin
*Attorney, Agent, or Firm*—Archie L. Robbins

[57] ABSTRACT

Density and flexural modulus of olefin polymers can be controlled using a chromium catalyst on a iron and aluminum phosphate and/or polyphosphate gel base.

29 Claims, No Drawings

OLEFIN POLYMERIZATION

This application is a division of application Ser. No. 688,928, filed Jan. 4, 1985 now U.S. Pat. No. 4,622,371, patented Nov. 11,1986.

This invention relates to olefin polymerization catalysts.

Aluminum phosphate is known as a hydrocarbon conversion catalyst. Aluminum phosphate is also known as a base for chromium in olefin polymerization reactions. A slurry system utilizing this catalyst is an economical route to produce olefin polymers. However with the slurry system there is very little leeway in controlling the physical properties of the olefin polymer produced. Thus there is a need for control in chromium on aluminum phosphate catalyst systems.

One object of this invention to provide an improved phosphate base for a chromium olefin polymerization catalyst. Another object of this invention to provide an olefin polymerization catalyst with greater ability to control the physical properties of the olefin polymer. Another object of this invention to provide a broad spectrum of polymers of varying density and flexural modulus from a single catalyst system. A further object of this invention is to provide an improved phosphate base catalyst system.

SUMMARY OF THE INVENTION

In accordance with this invention, aluminum phosphate or aluminum polyphosphate is formed with a phosphate of iron or polyphosphate of iron. The resulting co-gel is used as a base for chromium olefin polymerization catalyst. The co-gel can also be used in conjunction with an organoboron cocatalyst in olefin polymerization.

DESCRIPTION OF THE PREFERRED EMBODIMENT

The base is a combination of aluminum and iron phosphates and/or polyphosphates or mixtures thereof. The iron phosphate or iron polyphosphate can constitute any amount of the base as long as it is present. Generally iron phosphate or polyphosphate will be present in an amount ranging from about 1 to 100 mole percent of the base, but preferably ranges from about 5 to about 60 mole percent, the remainder being mostly aluminum phosphate and/or aluminum polyphosphate.

Any suitable method can be used to prepare the base. Four suitable methods are set out hereinafter. First, conventional techniques for preparing aluminum phosphate are disclosed in Hill et al, U.S. Pat. No. 4,219,444, the disclosure of which is hereby incorporated by reference. In this method, iron and aluminum salts are combined with a source of phosphate ions in an aqueous medium and neutralized with a neutralizing agent (such as ammonia) to give a hydrogel. The neutralizing agents which can be used are described in more detail later. Alternatively, a polar organic solvent can be used.

The second method for forming the base of the catalyst system of this invention is to combine alkoxides of the aluminum and iron with phosphoric acid to give a hydrogel directly as disclosed with regard to aluminum phosphate in Pine, U.S. Pat. No. 3,904,550, the disclosure of which is hereby incorporated by reference.

In the third method, salts of aluminum and iron which will melt can be used, with the source of the phosphate ions combined with the melt and then neutralized to give the hydrogel. Generally those aluminum salts with a sufficiently low melting point are hydrated. Orthophosphoric acid and orthophosphates such as monoammonium phosphate and diammonium hydrogen phosphate or mixtures of monoammonium and diammonium phosphate are preferred sources of phosphate ions. The scope of the phosphate ion source can be the same as in the first method. In a variation of this third method, a concentrated syrup of the metal salts is used. Thus, the third method can be broadly viewed as employing a concentrated mass of the acid phase (source of metals and source of orthophosphate ions).

Alternatively, in method three and possibly method one, the metal phosphate composition can be partially neutralized and allowed to sit as a strongly acid composition until gelation occurs spontaneously.

The fourth method employs a source of polyphosphate ions, a source of aluminum ions or an aluminum alkoxide, and source of iron ions, usually ferric ions or an iron alkoxide which are combined to produce a mixed aluminum/iron polyphosphate. For example, sodium pyrophosphate, aluminum nitrate and ferric nitrate can be combined in methanol to form a mixed aluminum/iron pyrophosphate. Alternatively, a mixture of polyphosphoric acid, aluminum salt and iron salt can be combined and neutralized to produce the mixed metal polyphosphates. While the polyphosphoric acid can be pyrophosphoric acid, generally a mixture of acids is used. They can be obtained, for instance, by partially hydrolyzing phosphorous pentoxide in an aprotic solvent such as methyl cyanide to produce a mixture comprising orthophosphoric acid, pyrophosphoric acid, triphosphoric acid, tetraphosphoric acid and pentaphosphoric acid. When mixed phosphoric acids are employed the mixture generally contains greater than 50 mole percent of the polyphosphoric acids.

When metal alkoxides are employed, generally the alkyl radical contains from 1 to about 6 carbon atoms. For example, aluminum isopropoxide and iron (III) ethoxide can be used.

The metals (excluding chromium) and phosphorus components are selected so as to generally give an atom ratio of phosphorus to total metals within the range of 0.2:1 to 2:1, preferably 0.2:1 to 0.9:1.

In the preparations involving an aqueous medium, it is preferred to remove water by azeotropic distillation or by washing with a volatile, water miscible, low surface tension organic liquid. In the techniques not employing water or a solvent, any small amount of water carried over from water of hydration or from the base used in the neutralization can be removed by conventional spray drying, tray drying or oven drying, thus avoiding the necessity for azeotropic distillation. However, even in these situations, if it is desired to water wash the hydrogel to remove soluble impurities, then azeotropic distillation or washing with a volatile oxygen containing water miscible solvent is desirable. After removal of water in this manner, the gel is preferably dried of solvent under mild conditions, for instance by heating at a temperature of 25° to 110° C., most preferably under vacuum.

It may be desirable in some instances to coprecipitate other materials with the phosphates or have other materials present during the gelation. For instance, a chromium compound such as chromium nitrate can be introduced with the reactants, as can a silicon component such as silicon tetraethoxide.

It is frequently preferred that a small amount of a boron compound such as B(OH)$_3$ be introduced into the melt which is to be precipitated with the metal phosphates. Other suitable boron compounds include borates such as ammonium borate. By coprecipitated as it relates to the boron compound, it is meant that the metal phosphates are formed into a true hydrogel in the presence of the boron compound. It is not known to what extent the borate becomes incorporated into the hydrogel structure. The amount of boron compound present when the metal phosphates are gelled can vary widely but it is generally used in an amount so as to give about 1 to 30 mole percent boron compound based on the moles of phosphates.

The neutralization in the first and third methods can be carried out either by adding the acid phase (mixed metal salts and source of phosphate ions) to the base phase (neutralizing agent) or vice versa (or by adding both to a third vessel). One suitable practice is to drip the acid phase into the base phase. This results in the production of small spheres or balls of the orthophosphates, particularly with the third method where the melt of metal salt or salts and source of phosphate ions is dripped or sprayed or otherwise slowly added to a large excess of ammonium hydroxide. The spheres are subsequently collected, washed, dried and calcined.

Gelation occurs spontaneously at a pH of about 2–4, which is achieved by combining about 60–75 percent of the neutralizing agent, and it has been found, particularly in technique three, that this is undesirable. Therefore, neutralization is preferably achieved by either: (1) combining slowly with stirring about 70–75 percent of the amount of neutralizing agent needed for complete neutralization and thereafter quickly adding the rest so as to achieve gelation at a pH of 5 or greater, preferably at least 6, generally 6 to 10, or (2) combining 60 to 70 percent of the neutralizing agent needed for complete neutralization and aging until gelation occurs which will generally be 1 minute to 48 hours, more generally 5 minutes to 10 hours, more generally 10 minutes to 3 hours; thus, gelation occurs at a pH below 4, generally about 2. While any basic solution can be used, concentrated ammonium hydroxide, ammonia gas, or ammonia dissolved in an alcohol or other non-aqueous solvent are preferred. Other suitable neutralizing agents include ammonium carbonate used alone or in combination, ethylene oxide and propylene oxide. Alternatively, in techniques one and three, particularly one, the phosphate can be in the neutralizing agent.

In addition to the four methods, compositions containing the cited component ranges can be prepared by mixing separately prepared bases comprising aluminum phosphate or polyphosphate and iron phosphate or polyphosphate.

Each base or mixture thereof can be admixed with a chromium compound, as outlined herein, to form a mixed catalyst.

The chromium also can be coprecipitated as noted hereinabove or can be added to the hydrogel. For example, a water soluble chromium compound, such as chromium nitrate, chromium acetate, ammonium dichromate, or CrO$_3$ can be added to the hydrogel. Alternatively, a chromium compound soluble in an anhydrous solvent such as hydrocarbon can be used to impregnate the gel or xerogel prior to activation. Suitable chromium compounds for such anhydrous impregnation include chromium (II) acetylacetonate and tertiarybutyl chromate. The chromium compounds are used in amounts sufficient to give 0.001 to 10, preferably 0.1 to 5, more preferably about 1 weight percent chromium, based on the weight of the xerogel base. (The term xerogel is used to refer to the predominantly amorphous gel resulting from the removal of free water from the hydrogel.)

Zerovalent chromium, such as dibenzene chromium, ditoluene chromium, or dicumene chromium, can also be used. The use of phosphate supported zerovalent Cr is disclosed in McDaniel et al, U.S. Pat. No. 4,444,968, hereby incorporated by reference. In such cases, the chromium is added after the base is activated and the composition is used without further high temperature activation in the presence of an oxidizing ambient. Zerovalent chromium can also be used as the chromium source in the embodiments using hexavalent chromium by adding it before calcination. Calcination then converts it to the hexavalent form. Other organochromium compounds such as dicyclopentadienyl chromium (II) can also be used in this way as a source of chromium.

A boron cocatalyst can also be used within the scope of this invention. The boron cocatalyst is preferably a trihydrocarbylborane, more preferably a trialkylborane, the alkyl groups preferably having 1 to 12, more preferably 2 to 5, carbon atoms per group. Triethylborane, tripropylborane and tributylboranes are presently preferred. Without the cocatalyst, the melt index would be too low for commercial use. The cocatalyst tends to raise it substantially, even to the point of being too high. In accordance with the invention, a low melt index can be achieved and the system is sufficiently sensitive to molecular weight control agents such as hydrogen that substantial leeway is possible with regard to the melt flow of the resulting polymer. Other boron compounds such as boron alkoxides, for instance B(C$_2$H$_5$)$_2$OC$_2$H$_5$, alkyl haloboron compounds, for instance BC$_2$H$_5$Cl$_2$, aryl borons such as triphenylborane and metal aryl borate (MBR$_4$) can also be used.

The boron compound cocatalyst is generally utilized in an amount so as to give an atom ratio of boron to chromium within the range of 0.5:1 to 15:1, preferably 2:1 to 10:1. Based on the solvent if any, these amounts of boron compound cocatalyst correspond to a range of 0.1 to 20, preferably 2 to 10 parts by weight per million parts by weight of the solvent, these amounts being based on the total reactor contents in instances where no solvent is utilized.

The boron-containing cocatalyst can either be premixed with the catalyst or added as a separate stream to the polymerization zone, the latter being preferred.

The catalyst systems of this invention can be further treated in the same manner as chromium on silica catalysts. These catalysts are sometimes given special treatments, such as being fluorided with for example, 0.5 to 5 weight percent ammonium bifluoride or other fluoriding agents, as known in the art, or being reduced and reoxidized by, for instance high temperature treatment in CO followed by activation as described herein in an oxidizing ambient.

The activation of the thus-formed xerogel can be carried out at a lower temperature than is generally required for activating silica-based chromium catalysts. Temperatures of 150°–800° C., preferably 300°–800° C., more preferably 300°–600° C., are suitable. The activating ambient can be any oxidizing ambient but for convenience and economy, an oxygen-containing ambient such as air is preferred. For example, activation can be accomplished in a fluidized bed. The chromium, if present, is at least predominantly in the hexavalent state after activation. If an excess of chromium over what will bond to the support is used, the excess may not be in the hexavalent state, if it remains on the catalyst at all. Times of 5 minutes to 24 hours, preferably 0.5 to 10 hours, are suitable for the activation or calcining step. The chromium is thought to be reduced in the polymerization zone by the monomer, probably to plus two oxidation state. If desired, this reduction may be carried out before the catalyst is contacted with the monomer, for instance in the activator.

The catalyst systems of this invention comprising a chromium compound on a predominantly amorphous mixed iron and aluminum phosphate-containing xerogel base can be used to polymerize at least one monoolefin containing 2 to 8 carbon atoms per molecule. The invention is of particular applicability in producing ethylene homopolymers and copolymers from mixtures of ethylene and one or more comonomers selected from 1-olefins containing 3 to 8 carbon atoms per molecule. Exemplary co-monomers for use with ethylene include aliphatic 1-olefins, such as propylene, 1-butene, 1-pentene, 1-hexene, 1-octene and other higher olefins and conjugated or non-conjugated diolefins such as 1,3-butadiene, isoprene, piperylene, 2,3-dimethyl-1,3-butadiene, 1,4-pentadiene, 1,5-hexadiene, and other such diolefins and mixtures thereof. Ethylene copolymers preferably constitute at least about 90, preferably 96 to 99.7 weight ethylene. Propylene, 1-butene, 1-pentene, 1-hexene, and 1-octene are especially preferred comonomers.

The polymers can be prepared from the catalyst of this invention by solution polymerization, slurry polymerization, and gas phase polymerization techniques or any other technique using conventional equipment and contacting processes. Contacting of the monomer or monomers with the catalyst can be effected by any manner known in the art of solid catalysts. One convenient method is to suspend the catalyst in an organic medium and to agitate the mixture to maintain the catalyst in suspension throughout the polymerization process. Other known contacting methods such as fluidized bed, gravitating bed, and fixed bed can also be employed. In one embodiment, the activated base and an organochromium compound such as dicumene chromium are separately charged to the reactor.

Of course, the main advantage of the instant catalyst system is the ability to vary density and flexural modulus by varying the relative amounts of iron and aluminum phosphates or polyphosphates in the xerogel. However, other properties of olefin polymers can be controlled using the instant catalyst.

The catalyst systems of this invention are particularly suitable for use in slurry polymerization systems to produce a complete spectrum of ethylene polymers so far as melt index is concerned, utilizing a single catalyst. Everything from blow molding grade resins which may require a melt index of as little as 0.1 or less to paper coating and injection molding grade resins which may require a melt index of 20 or greater can be produced from a single catalyst system simply by the use of a molecular weight control agent, such as hydrogen. While hydrogen is known as a molecular weight control agent, the catalyst of this invention displays an extraordinary sensitivity to hydrogen (and has just the right "starting point" melt index) so that by controlling the amount of hydrogen utilized, polymers having a very high molecular weight as indicated by low melt index, through polymers having a very low molecular weight as indicated by high melt index can be obtained.

Further control of melt index can be obtained by the small amount of leeway in temperature control and by the known effect of higher catalyst activation temperature causing the melt index of the resulting polymer to be higher. However, yet a further advantage of this invention is that a single activation temperature for the catalyst and a single polymerization temperature can be utilized and still obtain a broad spectrum of polymers utilizing a single catalyst. By "spectrum of polymers", it is meant that that catalyst can be used to produce a low melt index polymer at one time. Then at another time, the same type of catalyst can be used to produce a high melt index polymer or anything in between by adjusting other variables such as temperature and amount of hydrogen.

With slurry polymerization of ethylene and predominantly ethylene copolymer systems, the conventional temperature range is generally about 200°–230° F. (93°–110° C.) and the commercial systems are generally run as close to the maximum (i.e., the point at which polymer goes into solution) as possible, i.e., 225° F.±5° F. (107° C.±3° C.) in order to get the highest possible melt index. The catalyst of this invention allows running anywhere within this range including at the low end of the conventional temperature range, i.e., 205° F.±5° F.(96° C.±3° C.) in systems normally employing 225° F. (107° C.).

When hydrogen is used in the prior art, it is generally used at partial pressures up to 120 psia (0.83 MPa), preferably within the range of 20 to 70 psia (0.24 to 0.48 MPa). Similar amounts are used in accordance with this invention, although because of the high sensitivity to hydrogen, it is possible to use smaller amounts, for instance 10 to 70 psia.

EXAMPLE I

A series of catalysts was made by gelling aqueous solutions containing a mixture of $Al(NO_3)_3$, $NH_4H_2PO_4$ and $FeNH_4(SO_4)_2$, if employed, with sufficient concentrated ammonium hydroxide (28–30% $NH_3$) so that the gels formed at a pH ranging from about 3 to about 7. The calculated atom ratio of P/metal(s) was 0.8:1 for each cogel (or gel) produced. Gels having calculated atom ratios of Al/Fe of 9:1, 3:1, 1:1, and several gels containing no Fe or Al were made. In terms of atom percent Fe and Al, the above gels correspond to 10:90, 25:75, 50:50, 100:0 and 0:100. Each gel was then aged for 2 hours at room temperature, filtered, and washed with 4 L of tepid water containing 50 mL of concentrated ammonium hydroxide. The filter cake was set aside undisturbed overnight. The next morning each water-washed filter cake was additionally washed twice with 4 L portions of tepid isopropanol and dried overnight at about 80° C. in a vacuum oven. The dry products were each screened through a 50 mesh sieve and a portion thereof was calcined in a fluidized bed for 3 hours in air at 600° C., or as specified to obtain a xerogel, cooled, flushed with argon to remove the air and stored under argon pending further use. Catalysts were made from a portion of each calcined support under dry, air-free conditions by impregnation with a hydrocarbon solution of dicumenechromium (DCC) containing 1 g of Cr per 100 mL of solution sufficient to provide 1.5 weight percent Cr. The solvent was evaporated by gentle heating at about 35° C. to remove about 75 weight percent of the solvent to form the catalyst in the Flex. Mod., Flexural modulus, MPa: ASTM D 790-66.

TABLE IB

Ethylene Polymerization, Zerovalent Cr Catalysts

| Run No. | TEB ppm | Catalyst Wt g | Catalyst Atom % Fe | Polymer Yield g | Run Time min | Prod. g/g/hr | MI g/10 minutes | HLMI g/10 minutes | Density g/cc | Flex Mod. MPa |
|---|---|---|---|---|---|---|---|---|---|---|
| 1 | 8 | 0.1220 | 10 | 120 | 63 | 934$^{(a)}$ | 0.31 | 151 | 0.9552 | 977 |
| 2$^{(b)}$ | 0 | 0.1950 | 10 | 150 | 60 | 769 | 173.0 | — | — | — |
| 3 | 8 | 0.1568 | 25 | 113 | 50 | 865 | 0.10 | 39.8 | 0.9661 | 1059 |
| 4 | 8 | 0.3240 | 50 | 74 | 60 | 228 | 0.29 | — | 0.9665 | 1287 |
| 5 | 0 | 0.2332 | 50 | 41 | 60 | 176 | — | — | 0.9649 | — |
| 6 | 8 | 0.3648 | 100 | 13.7 | 410 | 55 | 0 | 0 | 0.9852 | — |
| 7 | 8 | 2.0061 | 100 | 47.7 | 60 | 24 | 0 | 0 | 0.9894 | — |
| 8$^{(c)}$ | 16 | 1.1503 | 100 | 27.8 | 40 | 42 | 0 | 15.3 | 0.9877 | 1375 |
| 9$^{(d)}$ | 16 | 1.1458 | 100 | 26.7 | 60 | 23 | 0 | 0.12 | 0.9885 | — |

A dash signifies no determination.
$^{(a)}$Polymer yield of 120 g/63 minutes is normalized to 60 minutes by the equation 120 g × 60 min/63 min = 114 g. Calculated productivity = 114 g/0.1220 g cat. = 934 g/g/hr. Calculated productivities for runs 6,8 were obtained in a similar manner.
$^{(b)}$Run in the presence of 50 psi hydrogen.
$^{(c)}$Run in the presence of 20 psi hydrogen.
$^{(d)}$0.8 wt. % Cr as dicumene chromium added to reactor based on weight of support plus Cr.

form of an apparently dry, greenish colored product. Each catalyst was stored in an inert atmosphere, e.g. nitrogen, until ready for ethylene polymerization tests. Each catalyst comprised zerovalent Cr and the indicated xerogel. The physical properties of the various calcined supports are given in Table IA.

TABLE IA

Physical Properties of supports

| Atom Percent Al | Atom Percent Fe | Activation Temp. °C. | Surface Area m²/g | Pore Volume cc/g |
|---|---|---|---|---|
| 0 | 100 | 300 | 218 | 0.39 |
| 0 | 100 | 500 | 254 | 0.52 |
| 50 | 50 | 600 | 118 | 0.46 |
| 75 | 25 | 600 | 208 | 1.14 |
| 90 | 10 | 600 | 254 | 1.11 |
| 95 | 5 | 600 | 364 | 1.21 |
| 100 | 0 | 600 | 375 | 1.10 |

Surface area determined by B.E.T. method.
Pore volume, nitrogen adsorption (saturated).

Ethylene polymerization was conducted with a weighed portion of each catalyst in individual runs under particle form (slurry) conditions in a 1 L stirred, stainless steel reactor containing about 1.25 lbs. (567 g) of isobutane at a nominal reactor pressure of about 565 psia (3.89 MPa), a nominal reactor temperature of 205° F. (96° C.) and a run time of 60 minutes unless indicated otherwise. When shown, the polymerization was conducted in the presence of the indicated amount triethylborane (TEB), if used, based on the diluent weight and/or the specified amount of hydrogen as reactor adjuvants. Each run was terminated by venting the volatile components. The polymer was recovered, dried, weighed and stabilized with a conventional antioxidant system prior to determining its physical properties. The results are given in Table IB. The following nomenclature is used.

Productivity (prod), g/g: grams polymer per gram supported catalyst per 60 minutes. If a run time other than 60 minutes is used, productivity is normalized to 60 minutes by assuming catalyst activity is linear over the time span.

MI: melt index, g/10 minutes, ASTM D 1238-65T, Condition E.

HLMI: high load melt index, g/10 minutes, ASTM D 1238-65T, Condition F.

Density, g/cc: ASTM D 1505-68.

Examination of the data presented in Table IB with the metal phosphate supported zerovalent Cr catalysts of runs 1-8 indicate that as the Fe phosphate content of the support increases from 10 to 100 mole percent the activity of the supported catalyst substantially decreases from 934 g/g/hr to about 24 g/g/hr. The reason for the decline in catalytic activity appears to be a function of lower surface areas and substantially lower pore volumes of the xerogels, e.g. 1.21 g/cc to 0.39 g/cc as the amounts of Fe phosphate in the support increase from 10 to 100 percent. Simultaneously, however, the density of the resulting polyethylene is drastically increased from 0.9552 g/cc to 0.9894 g/cc over this same range of increasing Fe phosphate content. In line with increasing polymer density is increasing flexural modulus as would be expected. The polymer results also suggest that melt index of the polymer is substantially decreasing over the cited range of increasing Fe phosphate content. In run 1, 10 mole % Fe phosphate in the support, the HLMI was 151. In run 3, 25 mole % Fe phosphate in the support, the HLMI was about 40 and in run 4, 50 mole % Fe phosphate in the support, a zero (no flow) HLMI was obtained. The zero value indicates that an ultrahigh molecular weight polymer was produced having an unusually high density of 0.9665 g/cc. With a support comprising 100% Fe phosphate, an ultrahigh molecular weight polymer was produced again having an extraordinarily high density of 0.9894 g/cc as evidenced in run 7. The supported catalysts are responsive to the presence of hydrogen in the reactor based on the polymer melt index increase. In comparing runs 1 and 2, polymer melt index increased from about 0.3 to about 170 when about 50 psi hydrogen was employed with a support containing 10 mole % Fe phosphate. Similarly, for a support containing 100% Fe phosphate, the HLMI of polymer made with hydrogen absent was zero in runs 6, 7 and was about 15 in run 8 in which about 20 psi hydrogen was used. A portion of unused Fe phosphate support employed in runs 6-8, was calcined in air for 3 hours at 500° C. A portion thereof plus separately injected dicumene chromium was employed in run 9. Its activity was about the same as the precontacted zerovalent catalyst of run 8. However, based on the HLMI value of 0.12 for the polymer, the catalyst of run 9 produced lower molecular weight polymer than the catalyst of run 8.

EXAMPLE II

All of the catalysts employed comprised hexavalent Cr supported on Fe/Al cogel xerogels. All supports had a P/metal(s) atom ratio of 0.8. Three of the catalysts were prepared by oxidizing unused portions of the catalysts employed in runs 1,3 and 4 of Table I, e.g. the cogel xerogel supports comprising, respectively, 10 mole percent Fe phosphate, 25 mole percent, Fe phosphate and 50 mole percent Fe phosphate. The oxidation process comprised calcining in air at 500° C. for 3 hours as before. One new catalyst support comprised 5 mole percent Fe phosphate and 95 mole percent Al phosphate and contained about 1.4 weight percent Cr based on the weight of support plus Cr in the form of an oxide. It was prepared from an aqueous solution containing 0.949 mole of $Al(NO_3)_3 \cdot 9H_2O$, 0.050 mole of $FeNH_4$-$(SO_4)_2 \cdot 12H_2O$, 0.800 mole of $NH_4H_2PO_4$ and 0.035 mole of $Cr(NO_3)_3 \cdot 9H_2O$ by gelation as before with concentrated ammonium hydroxide. The resulting gel was aged, washed and dried as before. The dry material was screened as before then a portion thereof was calcined for 4 hours in air at 600° C. in a fluidized bed, cooled, flushed with argon and stored pending its use as a catalyst in ethylene polymerization. The comparison catalyst, containing no Fe phosphate and 1.5 weight percent Cr, was prepared by gelling an aqueous solution containing Al nitrate, Cr nitrate and $NH_4H_2PO_4$ with concentrated ammonium hydroxide. The gel was aged, washed, dried, screened, and calcined for 3 hours in air at 600° C. as before to produce the catalyst. The P/Al atom ratio of the support was 0.8.

Weighed portions of each catalyst were employed in individual runs to polymerize ethylene as before under particle form conditions. The nominal reactor temperature was 96° C., the nominal reactor pressure was 565 psia and each run was conducted with 8 ppm TEB in the reactor based on the weight of isobutane diluent. The results are set forth in Table II.

TABLE II

| | Ethylene Polymerization, HEXAVALENT Cr Catalysts | | | | | | | |
|---|---|---|---|---|---|---|---|---|
| | Catalyst | | Polymer | Run | | | | |
| Run No. | Wt g | Atom % Fe | Yield g | Time min | Prod. g/g/hr | MI g/10 | HLMI minutes | Density g/cc | Flex Mod. MPa |
| 10 | 0.0444 | 0 | 50 | 21 | 3220 | 0.15 | 37 | 0.9680 | 1503 |
| 11 | 0.0453 | 5 | 189 | 60 | 4170 | 1.3 | 136 | 0.9713 | 1776 |
| 12 | 0.1180 | 10 | 202 | 60 | 1710 | 0.53 | 92 | 0.9711 | 1543 |
| 13 | 0.1061 | 10 | 245 | 30 | 4620 | 0.33 | 77 | 0.9707 | 1469 |
| 14 | 0.1218 | 25 | 61 | 60 | 500 | 0.37 | 85 | 0.9710 | 1595 |
| 15 | 0.1788 | 50 | 5.6 | 54 | 31 | — | — | 0.9887 | — |

Examination of the data in Table II shows that as the Fe phosphate content of the support increases from 5 mole percent (run 11) to 50 mole percent (run 15) the activity of the catalyst declines. This is a result of the pore volume of the catalyst decreasing with increased Fe phosphate content as shown in Example I. All of the invention catalysts in runs 11–15 produced higher density polyethylene than the comparison catalyst of run 10. Runs 12,13 were run with portions of the same catalyst. The only difference was that different stock solutions of TEB were employed. In view of the observed substantial difference in productivities of these runs it may be that the actual concentration of the TEB employed in run 12 was much less than the reported 8 ppm since an old stock solution, possibly inadvertently contaminated with oxygen or moisture thereby reducing the TEB content, was used. It is known that a TEB level up to about 8 ppm can increase activity of hexavalent Cr/Al phosphate catalysts.

In comparing the results of Tables I and II at identical levels of Fe phosphate in the supports, the data show that the hexavalent Cr catalysts are more active than their zerovalent Cr counterparts. Moreover, at least up to about 50 mole percent Fe phosphate in the support, the data also demonstrate that polymers produced with the hexavalent Cr catalysts are higher in density, e.g. run 1 polymer had a density of 0.9552 g/cc and its hexavalent counterpart of run 12 had a density of 0.9711 g/cc, and have higher flexural moduli as a result than polymers produced with the corresponding zerovalent Cr catalysts.

I claim:

1. An olefin polymerization catalyst comprising a chromium compound on a xerogel base comprising at least one iron compound selected from the group consisting of iron phosphate and iron polyphosphate, and at least one aluminum compound selected from the group consisting of aluminum phosphate and aluminum polyphosphate, wherein, prior to drying, said xerogel base was contacted with a volatile oxygen containing water miscible low surface tension organic liquid to remove water.

2. A catalyst according to claim 1 wherein the atomic ratio of phosphorus to total metals in said xerogel base is within the range of 0.2:1 to 2:1, and the pore volume of said xerogel base is within the range of 0.39 to 1.21 cc/g.

3. A catalyst according to claim 1 wherein chromium is present on a predominantly amorphous xerogel base in an amount ranging from about 0.1 to about 5 weight percent based on the weight of said xerogel base.

4. A catalyst according to claim 1 wherein said iron compound is present in an amount of at least about 1 mole percent of the base.

5. A catalyst according to claim 4 wherein said iron compound is present in an amount ranging from about 5 to about 60 mole percent of the base.

6. A catalyst comprising a chromium compound on a xerogel base comprising at least one iron compound selected from the group consisting of iron phosphate and iron polyphosphate, and at least one aluminum compound selected from the group consisting of aluminum phosphate and aluminum polyphosphate, wherein said chromium compound is a zerovalent chromium compound.

7. A catalyst according to claim 6 wherein said zerovalent chromium compound is selected from the group consisting of dibenzene chromium, ditoluene chromium, and dicumene chromium.

8. A catalyst according to claim 1 wherein the chromium of said chromium compound is oxidized to hexavalent chromium.

9. A catalyst according to claim 1 wherein said chromium compound is selected from the group consisting of chromium nitrate, chromium acetate, ammonium dichromate, chromium trioxide, chromium (II) acetylacetonate, and tertiary-butyl chromate.

10. A catalyst according to claim 1 wherein a boron cocatalyst is also present.

11. A catalyst according to claim 10 wherein said boron cocatalyst is a trialkylborane cocatalyst.

12. A catalyst according to claim 11 wherein said trialkylborane cocatalyst is selected from the group consisting of triethylboranes, tripropylboranes, and tributylboranes.

13. A method for preparing a polymerization catalyst, said method comprising:
   (a) preparing a hydrogel comprising about 1 to about 100 mole percent of at least one iron compound selected from the group consisting of iron phosphate and iron polyphosphate, with the remainder of said hydrogel being at least one aluminum compound selected from the group consisting of aluminum phosphate and aluminum polyphosphate, and
   (b) removing free water from said hydrogel using a volatile oxygen containing water miscible low surface tension organic liquid followed by drying, to produce a xerogel, and
   (c) activating said xerogel at an elevated temperature in the presence of an oxidizing ambient.

14. A method of claim 13 wherein said xerogel is treated in an oxidizing ambient at a temperature in the range of about 150 to about 800° C. for a time in the range of about 5 minutes to about 24 hours.

15. A method of claim 13 wherein said hydrogel is formed in the presence of at least one additional component selected from the group consisting of chromium, boron, and silicon compounds.

16. A method for preparing a polymerization catalyst, said method comprising:
   (a) preparing a hydrogel comprising about 1 to about 100 mole percent of at least one iron compound selected from the group consisting of iron phosphate and iron polyphosphate, with the remainder of said hydrogel being at least one aluminum compound selected from the group consisting of aluminum phosphate and aluminum polyphosphate, and
   (b) removing free water from said hydrogel to produce a xerogel, wherein said hydrogel is formed in the presence of a boron compound present in an amount to provide in said hydrogel about 1 to about 30 mole percent boron compound based on the moles of phosphates.

17. A method of claim 16 wherein said xerogel is treated in an oxidizing ambient at a temperature in the range of about 150 to about 800° C. for a time in the range of about 5 minutes to about 24 hours.

18. A method of claim 13 further comprising impregnating said xerogel with a sufficient amount of a chromium compound to provide a composition containing about 0.001 to about 10 weight percent chromium based on the weight of said xerogel.

19. A method of claim 18 wherein said xerogel is treated in an oxidizing ambient at a temperature in the range of about 150 to about 800° C. for a time in the range of about 5 minutes to about 24 hours.

20. A method of claim 18 wherein said hydrogel is formed by coprecipitating said iron and aluminum compounds.

21. A method of claim 18 wherein said hydrogel is formed in the presence of a boron compound present in an amount to provide in said hydrogel about 1 to about 30 mole percent boron compound based on the moles of phosphates.

22. A method of claim 21 wherein said xerogel is treated in an oxidizing ambient at a temperature in the range of about 150 to about 800° C. for a time in the range of about 5 minutes to about 24 hours.

23. A method according to claim 13 wherein said iron compound is present in an amount ranging from about 5 to 60 mole percent of the hydrogel.

24. A method according to claim 13 wherein a boron cocatalyst is also present and an anhydrous solvent soluble chromium compound is impregnated onto the catalyst prior to activation.

25. A method according to claim 13 wherein after the activation of step (c) a chromium compound selected from the group consisting of zerovalent chromium and chromium(II) is added to said xerogel.

26. A catalyst produced according to the process of claim 13.

27. A catalyst produced according to the process of claim 16.

28. A catalyst produced according to the process of claim 24.

29. A catalyst produced according to the process of claim 25.

* * * * *